United States Patent [19]

Frankot et al.

[11] Patent Number: 5,677,693
[45] Date of Patent: Oct. 14, 1997

[54] MULTI-PASS AND MULTI-CHANNEL INTERFEROMETRIC SYNTHETIC APERTURE RADARS

[75] Inventors: Robert T. Frankot, Van Nuys; Ramesh Rampertab, Los Angeles, both of Calif.

[73] Assignee: Hughes Aircraft Company, Los Angeles, Calif.

[21] Appl. No.: 249,762

[22] Filed: May 26, 1994

[51] Int. Cl.$^6$ ................................................. G01S 13/00
[52] U.S. Cl. ................................................. 342/25
[58] Field of Search ................................................. 342/25

[56] References Cited

U.S. PATENT DOCUMENTS

| | | | |
|---|---|---|---|
| 5,332,999 | 7/1994 | Prati et al. | 342/25 |
| 5,334,980 | 8/1994 | Decker | 342/25 |
| 5,343,204 | 8/1994 | Farmer et al. | 342/25 |
| 5,353,030 | 10/1994 | Koch et al. | 342/164 |
| 5,394,151 | 2/1995 | Knaell et al. | 342/25 |

*Primary Examiner*—J. Woodrow Eldred
*Attorney, Agent, or Firm*—Leonard A. Alkov; Wanda K. Denson-Low

[57] ABSTRACT

A method of providing accurate elevation data from three or more complex SAR images. A SAR vehicle is operated to produce a number of SAR images at different grazing angles. The present method provides precise elevation maps derived from the SAR images. In a multiple channel variant of the present invention, more than two antennas collect SAR data from various grazing angles, increasing sensitivity while resolving the ambiguity problem in a mathematically optimum manner. A multiple pass variant of the present invention collects data from more than two passes, and from various grazing angles (interferometric "baselines"). The multiple pass approach and associated processing preserves the high sensitivity of the long-baseline available from dual pass IFSAR while resolving the ambiguity problem in a mathematically optimum manner. Accuracy and ambiguity resolution are improved with each additional pass or channel. The method processes raw SAR data to produce a plurality of complex images therefrom. The complex images are processed to produce a plurality of linear phase matched complex images and predetermined processing parameters. The plurality of linear phase matched complex images are then processed to produce a elevation map. The plurality of linear phase matched complex images are produced by matching noise power contained in each of the complex images to normalize the images to compensate for differences in gain of the systems from scan to scan, matching linear phase values of each of the complex images to correct for phase differences by estimating phase matching parameters for each of the complex images, estimating a phase-difference scale factor for each of the complex images, and ordering each of the complex images in terms of increasing phase difference scale factors. The linear phase values of each of the complex images are matched by computing a pairwise interferogram for adjacent complex images, summing sample-pair products of the interferogram to estimate the linear phase thereof, and computing the phase of the summed sample-pair products. The elevation map is computed by computing an initial elevation map using conventional IFSAR techniques applied to a pair of complex images, estimating additive phase correction values for each of the linear phase matched complex images, and estimating elevation values by maximizing the magnitude of the complex weighted sum of M complex images or complex interferograms, where the weights include the phase attributable to the estimated elevation to produce the elevation map.

15 Claims, 3 Drawing Sheets

MULTI-PASS AND MULTI-CHANNEL INTERFEROMETRIC SYNTHETIC APERTURE RADARS

BACKGROUND

The present invention relates to synthetic aperture radar systems, and more particularly, to a signal processing method for use with multi-pass and multi-channel interferometric synthetic aperture radars.

Prior art relating to interferometric synthetic aperture radar systems include traditional surveying methods, e.g. on the ground survey with chain and transit, stereoscopic aerial photography, stereoscopic SAR imaging, and more recently, single pass, dual channel IFSAR and dual pass, single channel IFSAR.

In the single pass, dual channel IFSAR approach, one aircraft (or spacecraft) with two antennas collects SAR data from both antennas. This approach is described in L. C. Graham, "Synthetic Interferometer Radar for Topographic Mapping", Proc. IEEE, Vol. 64, pp. 763-768, June 1974, and E. Im, "Altimeter Systems for High-Resolution Land and Ice Topographic Mapping", International Geoscience and Remote Sensing Symposium, University of Maryland, College Park, Md., pp. 823-826, May 1990. While the single pass system is convenient, it is often limited in sensitivity, especially at long ranges, due to the small difference in the grazing angles for each channel. The sensitivity can be increased by increasing the elevation separation of the antennas. However, with increased sensitivity comes increased ambiguity. There are several approaches to coping with the ambiguities based on assumptions about terrain smoothness.

In the dual pass, single channel IFSAR approach, two passes are used to collect two SAR images. An article by F. Li et al. entitled "Studies of Multi-baseline Spaceborne Interferometric Synthetic Aperture Radars", IEEE Trans. Geocsience and Remote Sensing, Vol. 28, pp. 88-97, January 1990 describes this approach. In this approach the grazing angle difference is under the control of the radar operators but with increased sensitivity comes increased ambiguity even beyond that of the single-pass dual-channel approach.

It is an objective of the present invention to provide for a signal processing method for use with multi-pass and multi-channel interferometric synthetic aperture radars.

SUMMARY OF THE INVENTION

In order to meet the above and other objectives, the present invention provides for a signal processing method for use with multi-pass and multi-channel interferometric synthetic aperture radar systems. The method comprises the steps of processing raw synthetic aperture radar data to produce a plurality of complex synthetic aperture radar images therefrom, processing the complex synthetic aperture radar images to produce a plurality of linear phase matched complex synthetic aperture radar images and predetermined processing parameters, and processing the plurality of linear phase matched complex synthetic aperture radar images to produce a synthetic aperture radar elevation map. The step of processing the raw synthetic aperture radar data to produce a plurality of complex synthetic aperture radar images comprises the steps of compensating for relative motion between each of the plurality of complex images, converting the plurality of complex images into ground plane polar format, compressing range data associated with each of the complex images, and registering each of the complex images to each other.

The step of processing the complex synthetic aperture radar images to produce a plurality of linear phase matched complex synthetic aperture radar images comprises the steps of matching noise power contained in each of the complex images to normalize the images to compensate for differences in gain of the systems from scan to scan, matching linear phase values of each of the complex images to correct for phase differences by estimating phase matching parameters for each of the complex images, estimating the baseline ratios between pairings of the complex images, and ordering each of the complex images in terms of their phase-difference scale factors. The step of matching linear phase values of each of the complex images comprises the steps of computing a pairwise interferogram for adjacent complex images, summing sample-pair products of the interferogram to estimate the linear phase thereof, and computing the phase of the summed sample-pair products.

The step of matching linear phase values of each of the complex images may further comprise the step of applying a soft limiter to a magnitude component of the interferograms before the above summations are performed, preventing a few very large magnitude samples from dominating the estimate. The step of summing sample-pair products may comprise the step of computing a magnitude-weighted median phase. The step of ordering each of the complex images comprises the steps of finding an image-pair having the smallest interferometric phase-difference scale factor, adding an image that results in the smallest increase in total elevation aperture is added to this list of image pairs, and repeating the above two steps until no more images remain.

Each image-pair has an associated phase-difference scale factor, i.e., the scale factor which relates object elevation to image phase-differences. This is proportional to the grazing angle difference of the two images and, when all images are collected from the same range to the object, it is proportional to the interferometric baseline (the elevation separation of the antennas measured orthogonal to the slant plane).

The step of processing the plurality of linear phase matched complex synthetic aperture radar images to produce a synthetic aperture radar elevation map comprises initialization steps that comprise computing an initial elevation map based on one image-pair and computing average signal power, computing additive phase corrections for each of the linear phase matched images, and estimating the elevation values at each (r,v) from all of the linear phase matched complex images to produce an elevation map. The additive phase correction and elevation estimation steps can be imbedded in a stepwise refinement procedure where the first three images are taken, then the first four, etc., and finally all M images are used to produce the elevation map.

The step of computing an initial elevation map based on one image-pair consists of conventional interferometric SAR processing, including phase unwrapping, applied to the complex image pair with the smallest phase scale factor to allow computation of additive phase corrections in later steps. The step of computing average signal power consists of averaging the signal power over all M images at each pixel to allow later computation of step size for elevation estimation and to allow later computation of elevation or accuracy.

The step of computing additive phase correction values comprises the step of estimating additive phase corrections that represent an unknown phase error that is constant throughout each image but varies from image-to-image by calculating the average complex image value after correcting for the current elevation estimate, and calculating the resulting average residual phase.

The step of estimating elevation values at each (r,v) from all of the linear phase matched complex images comprises the steps of estimating a lower bound of elevation accuracy derived from the Cramer-Rao lower bound, calculating a step size for elevation estimation based on this lower bound, estimating the elevation value by calculating an elevation that maximizes a log-likelihood function, saving the maximum sampled value and corresponding argument to provide a maximum-likelihood estimate of elevation, and saving the elevation and accuracy estimates. This elevation estimation step is but one implementation of a nonlinear weighted-least-squares estimation approach, the fundamental characteristic being the estimation of elevation by maximizing the magnitude of the complex weighted sum of M complex images or complex interferograms, where the weights include the phase attributable to the estimated elevation. No closed form solution exists without resorting to linearizations which degrade elevation estimation accuracy.

The present invention is a method of producing terrain height data which is especially advantageous because it is effective in all types of weather, day or night, is effective at long range, requires no modifications to a radar in which it is employed, requires no additional SAR data bandwidth, is effective for a single channel operation, and is equally applicable to multiple channel radars.

The present invention may be employed for long range standoff reconnaissance applications. A SAR vehicle (manned or unmanned) is operated to produce a number of SAR images at different grazing angles. The present invention provides precise SAR maps and other intelligence products on-demand for contingency, as well as long term operations.

The present invention may also be employed for civil engineering applications. Terrain elevation data and co-registered imagery provided by the present invention is capable of mapping inaccessible terrain in support of flood control and construction planning. The present invention can provide map updates to monitor ongoing or potential disasters such as volcanic eruptions, earthquakes, and floods. The present invention may also be employed to detect and analyze geological features important in oil and mineral exploration, for example.

In the multiple channel variant of the present invention, more than two antennas collect SAR data from various grazing angles, increasing sensitivity while resolving the ambiguity problem in a mathematically optimum manner. The multiple pass variant of the present invention collects data from more than two passes, and from various grazing angles (interferometric "baselines"). This multiple pass approach and associated processing preserves the high sensitivity of the long-phase-difference scale factor available from dual pass IFSAR while resolving the ambiguity problem in a mathematically optimum manner. Thus the present invention exceeds the high local accuracy provided by long-baseline interferometry and at the same time meets or exceeds the ambiguity performance provided by short-baseline interferometry. Accuracy and ambiguity resolution are improved with each additional pass or channel.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
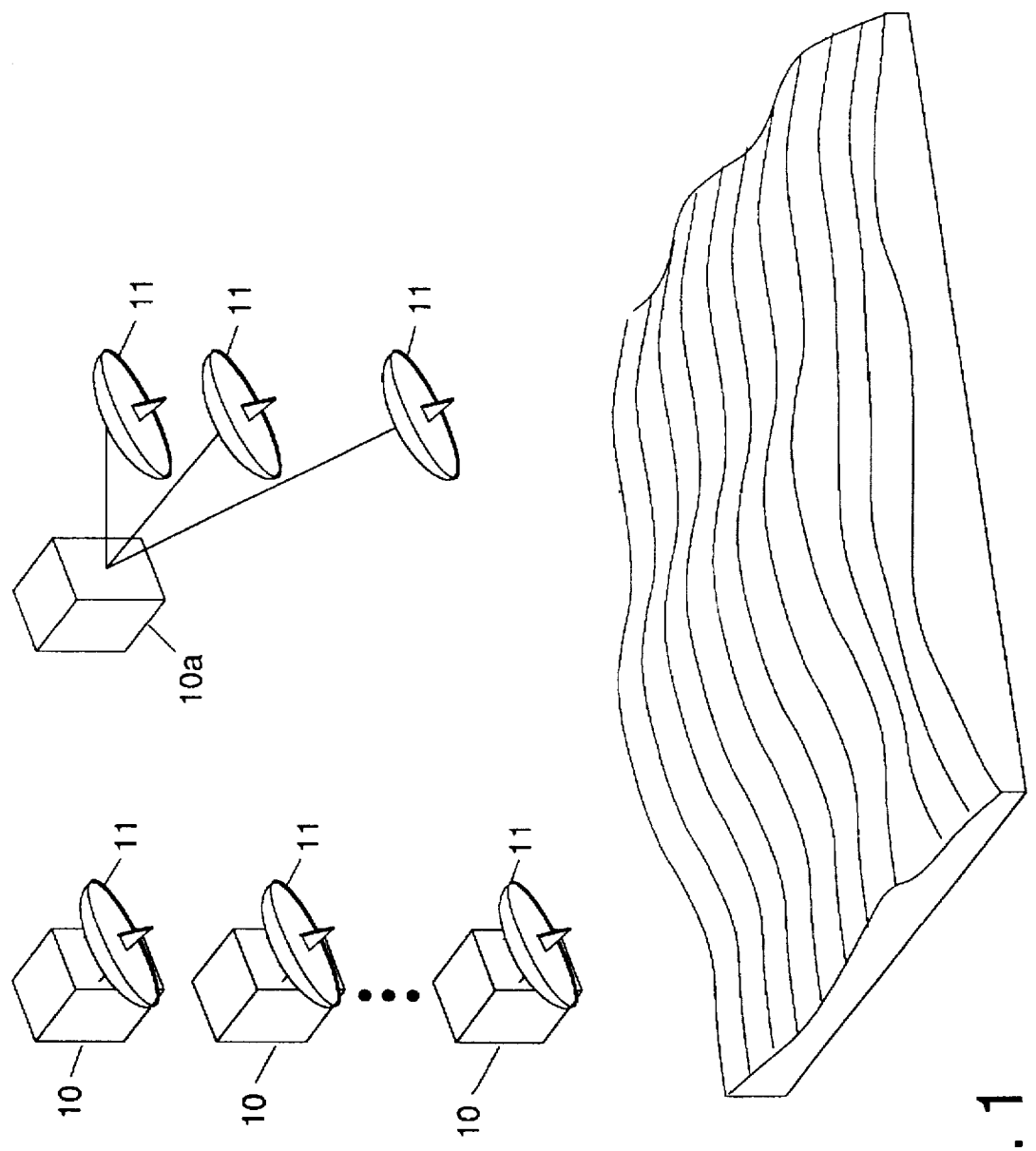
FIG. 1 illustrates operation of a multi-pass and multi-channel interferometric SAR in which processing methods in accordance with the present invention are employed.

Referring to the drawing figures, FIG. 1 illustrates operation of multi-pass and multi-channel interferometric synthetic aperture radars (SAR) 10, 10a in which a processing method 20 in accordance with the present invention is employed. The radars 10, 10a are operated in a conventional manner. Multiple SAR images are collected either with multiple passes of a single-channel radar 10 having a single antenna 11, or with a single pass of a multiple-channel radar 10 having multiple antennas 11, using a conventional SAR vehicle or platform, as are illustrated in FIG. 1.

Figure 2:
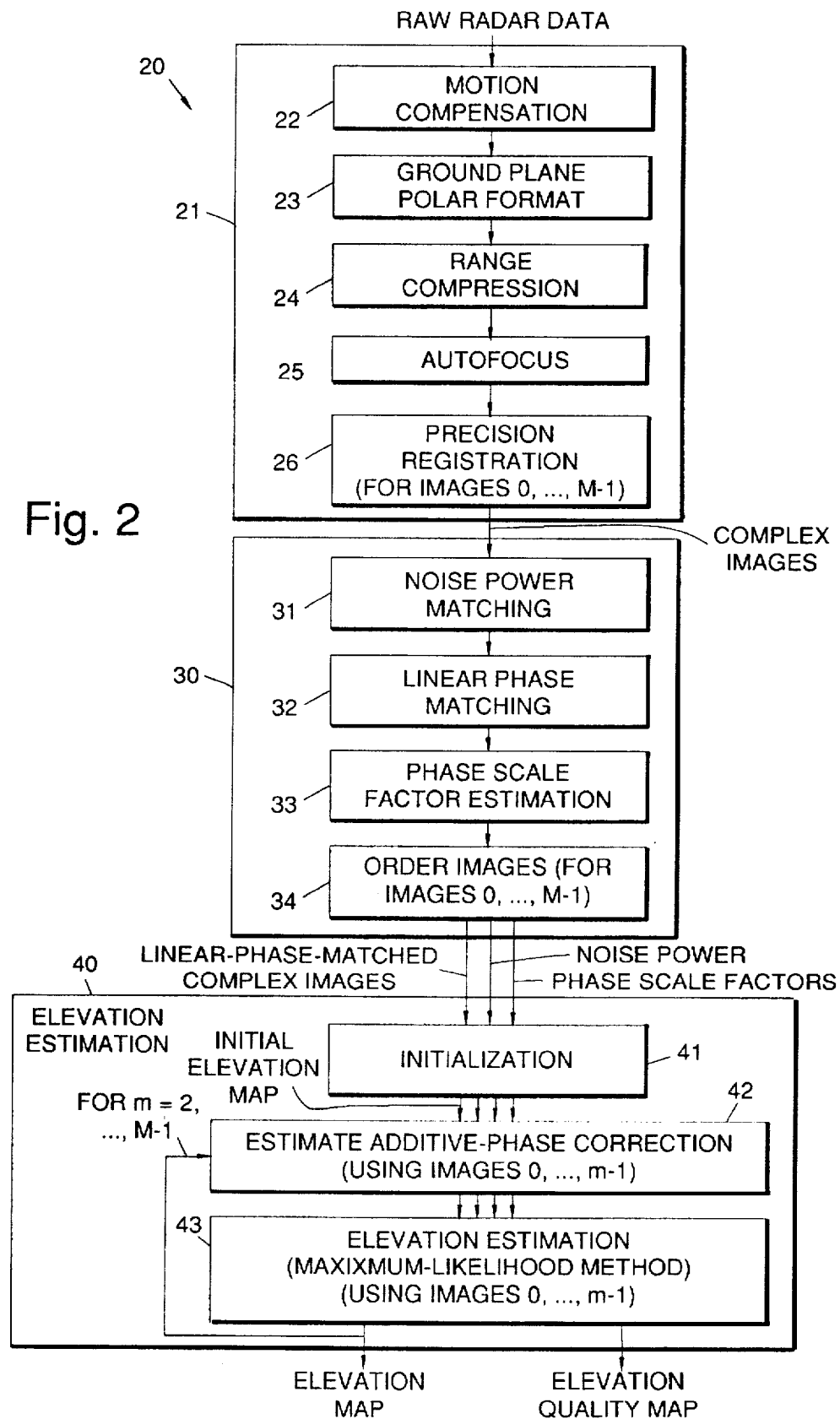
FIG. 2 is a flow diagram illustrating processing steps in the processing methods in accordance with the principles of the present invention.

FIG. 2 is a flow diagram illustrating processing steps in the processing method 20 in accordance with the principles of the present invention. The processing method 20 is comprised of three basic processing operations, identified as initial processing 21 that produces complex SAR images from raw SAR data, signal-based open-loop initial processing 30 in accordance with the present invention that processes the complex SAR images to produce linear phase matched complex images and several processing parameters, and elevation estimation processing 40 in accordance with the present invention that produces elevation and elevation quality maps as its output.

Image pairs are processed in the present method 20. Each image-pair has an associated phase-difference scale factor, i.e., a scale factor that relates object elevation to image phase-differences. This factor is proportional to the grazing angle difference of the two images and, when all images are collected from the same range to an object, it is proportional to the interferometric baseline (the elevation separation of the antennas 11 measured orthogonal to the slant plane).

The initial processing 21 employed in the present method 20 are as follows. Raw radar data is processed using conventional processing techniques to accomplish motion compensation (step 22), transform the data into ground plane polar format (step 23), and provide range compression (step 24), autofocus (step 25), and precision registration (step 26). These conventional processing techniques are well-known to those skilled in the SAR signal processing art and will not be described in detail.

The signal-based initial processing 30 in accordance with the present invention employed in the present method 20 is described in detail below. A mathematical model employed in the present invention relates system inputs, the elevation (output) to be estimated, and processing parameters that are estimated. A description of this model will help to better understand the processing performed by the present method 20.

Inputs to the present method 20 comprise multiple complex SAR images $A_m(r,v)$, m=0, ..., M−1 where r is range and v is azimuth or cross-range. Each $A_m(r,v)$ is a complex number. Outputs from the present method 20 comprise an elevation image u(r,v) in radar coordinates that is convened into a calibrated elevation map z(x,y) in geodetic coordinates using conventional techniques. An elevation error standard deviation estimate $\sigma_u(r,v)$ is also provided.

The inputs to the method 20 are modeled as follows.

$$A_m(r,v) = \begin{cases} a\exp\{-j(B_{0m}u(r,v) + s_{rm}r + s_{vm}v + \phi_{0m}\} + \eta_m(r,v) & \text{if } 0 < m \leq M-1 \quad (1) \\ a + \eta_0(r,v) & \text{if } m = 0 \end{cases}$$

where $B_{0m}$ is the phase-difference scale factor relating elevation to the phase difference between $A_0$ and $A_m$, proportional to the grazing angle difference between collection geometries for $A_0$ and $A_m$. $s_{rm}$ and $s_{vm}$ are linear phase error coefficients in range and azimuth, respectively. $\phi_{0m}$ is an unknown random phase that is constant in (r,v). The function $\eta_m(r,v)$ denotes zero-mean random complex Gaussian noise with noise power $\sigma_m$, uncorrelated in m and only weakly correlated in (r,v).

The present method 20 computes an estimated elevation u(r,v) as its output, and also estimates the parameters $B_{0m}$, $s_{rm}$, $S_{vm}$, $\phi_{0m}$, and $\sigma_m$ to provide for superior elevation accuracy.

After completing the above mentioned initial processing 20 to produce the complex images, comprising steps 22–26, the signal-based initial processing 30 is then performed as follows. Noise power is first computed (step 31). Linear phase matching (step 32), and phase-difference scale factor ratios (step 33) are then determined. For multiple pass IFSAR, there may be great uncertainty in these parameters and they are estimated from the signal as described below.

During the processing procedures of the signal-based initial processing 30, only relative values of the linear phase and phase scale factors are known. This allows accurate estimation of relative, not absolute, elevation. All elevation estimates share a common, unobservable error that may be calibrated through conventional means to produce a calibrated height or elevation map.

Noise power (gain) matching (step 31) is achieved as follows. The noise power matching step 31 normalizes the SAR images to compensate for differences in gain of the system 10, 10a from scan to scan. System gain $G_m$ is estimated using the average magnitude of the mth image, for example. The following normalization is then performed $$A_m(r,v) \leftarrow \frac{A_m(r,v)}{G_m} \quad (2)$$

Noise variance estimation is achieved as follows. The noise variance $\sigma_m$, m=0, ..., M−1 is an optional set of parameters needed only to achieve optimal accuracy. The present invention functions properly if $\sigma_m$ is an arbitrary constant, for example m=1/SIR where the SIR is signal-to-interference ratio specification for the SAR system 10, 10a. Actual SIR may also be estimated for each image (or even locally within an image) by several alternative means, for example, by measuring contrast ratio between low-return areas and average clutter or by examining residuals in the elevation estimation process.

Linear phase matching (step 32) is achieved as follows. The SAR images may have systematic phase differences because of slight differences in collection geometry (in the system 10), slight differences in radar hardware between channels (in the system 10a), or processor-induced error. The present method 20 corrects these systematic phase differences. The linear phase matching parameters are estimated for m=1, ..., M−1, for all but the first image. First, the following pairwise interferogram is computed $$A_{m0}(r,v) = A_m(r,v)A_0^*(r,v). \quad (3)$$

Linear phase is estimated by summing sample-pair products of the interferogram and then computing the phase of this sum. Specifically, the range component is $$S_{r0} = \sum_{r,v} A_{m0}(r,v)A_{m0}^*(r-1,v) \quad (4)$$

with phase computed as $$s_{rm} = \arctan(I(S_{r0}), R(S_{r0})), \quad (5)$$

where R and I denote the real and imaginary parts of a complex number, respectively. The azimuth component is $$S_{v0} = \sum_{r,v} A_{m0}(r,v)A_{m0}^*(r,v-1) \quad (6)$$

with phase computed as $$s_{vm} = \arctan(I(S_{v0}), R(S_{v0})). \quad (7)$$

Several refinements to the above method may produce more robust parameter estimates to further optimize accuracy. A soft limiter may be applied to the magnitude component of the interferograms before the above summations are performed, preventing a few very large magnitude samples from dominating the estimate. A magnitude-weighted median phase may also be computed in place of equations (4) through (7). This type of phase estimate is useful when phase averages are taken. Additional interferograms may be applied in the phase matching step 32 for greater accuracy, e.g. through a least-squares fit based on all $A_{mn}$ for all m,n, but with greater computational cost.

The following correction is then applied $$A_m(r,v) \leftarrow A_m(r,v)\exp\{j(s_{rm}r+s_{vm}v)\} \quad (8)$$

for m=1, ..., M−1. This correction may be combined with the gain matching of equation (2) if desired.

Interferometric phase-difference scale factor ratio estimation is achieved as follows. It is necessary to determine the ratio of effective interferometric phase-difference scale factors (grazing angle differences)

$$b_m = B_{0m}/B_{01} \quad (9)$$

between each image-pair. First, the second moment of the phase derivatives in range for each interferogram is calculated:

$$P_m = \frac{1}{K} \sum_{r,v} |\phi_r(r,v)|^2 \quad (10)$$

where $$\phi_r(r,v) = \arctan\{I(\alpha_{r0}), R(\phi(r,v))\} \quad (11)$$

and $$\alpha = A_{m0}(r,v)A^*_{m0}(r-1,v). \quad (12)$$

Then the estimated phase-difference scale factor ratio is the ratio of the second moments $$b_m = P_m/P_1 \quad (13)$$

for m=1, ..., M−1 with $b_1$=1. The common divisor $B_{01}$, which may be determined by conventional methods, is the factor that scales raw elevation estimates u into calibrated height z.

The effective interferometric phase-difference scale factor $B_{0m}$ determines the ratio between elevation derivatives and interferogram phase derivatives. The phase derivatives of different interferograms are therefore proportional to each other and the proportionality constant is the phase-difference scale factor ratio $b_m$. That ratio may be determined by a least-squares fit between the phase derivatives of the different interferograms. The above-described processing results as a special case of the least-squares fit. Additional interferograms (e.g. $A_{mn}$ for all m,n) and phase derivatives in azimuth may be applied in this phase-difference scale factor estimation process to provide for greater accuracy. The phase derivatives are noisy and are unambiguous only where the elevation derivatives fall below a certain value. Therefore accuracy may also be enhanced by censoring areas where the phase derivative exceeds a threshold ($\sim\pi/2$) in any one of the interferograms.

Ordering images according to estimated phase-difference scale factors (step 34) is achieved as follows. First, the image-pair with the smallest effective interferometric phase-difference scale factor (i.e. grazing angle difference) is found. These are denoted as $A_0$ and $A_1$. The image that results in the smallest increase in the total elevation aperture is added to this list. This is repeated until no more images remain. This ordering helps to simplify subsequent processing steps.

In some cases, such as with the multiple channel system 10a, for example, the images are taken under precisely known conditions. The gain, phase, and interferometric phase-difference scale factors are measured once and applied open-loop for many images or even for the life of the system 10a. The initial processing 21 described above may be used to perform this calibration or to validate open-loop calibration performed by other means Elevation estimation processing 40 is achieved as follows. This is a key signal processing function of the present method 20. It comprises the following iterative procedure. Initialization is performed first (step 41). For m=2, . . . , M−1, additive-phase corrections (for all (r,v), using images 0 through m) are estimated and elevation (for all (r,v), using images 0 through m) are estimated. Initialization is achieved by calculating an initial elevation map. The image-pair ($A_0, A_1$) with the shortest phase-difference scale factor is used to calculate the initial elevation map as follows $$\hat{u}(r,v) = \frac{1}{b_1} U(A_0 A_1^*) + \bar{u} \quad (14)$$

where U is a conventional two-dimensional phase unwrapping method, e.g. a least-squares method, such as is described in R. L. Frost, et al. "Fast FFT-Based Algorithm for Phase Estimation in Speckle Imaging", Applied Optics, Vol. 18, pp. 2056–2061, June 1979, and $\bar{u}$ is an average or nominal elevation for the image. If $\bar{u}$ is unknown, it is set to zero. This provides an initial elevation map to support estimation of additive-phase corrections. Coarse accuracy is sufficient because there are many samples in range and azimuth over which to average random elevation error. Phase unwrapping is used so that substantially all elevation samples are computed relative to the same elevation ambiguity, making it valid to average the phase error over many samples. Use of the shortest phase-difference scale factor is consistent with the approach of minimizing ambiguity while averaging significant random noise effects. The average signal power is then calculated. A sample-by-sample average of the magnitude of the gain-matched complex images is computed as follows:

$$|A(r,v)|^2 = \frac{1}{M} \sum_{m=0}^{M-1} |A_m(r,v)|^2. \quad (15)$$

This is used to compute the step size for elevation estimation and to compute elevation accuracy or quality. This yields a biased estimate of $|a|^2$, which is overestimated by an amount inversely proportional to effective SNR. For moderate SNR (e.g. 10 dB and greater), the bias is minimal. Asymptotically as M becomes infinite this yields an upper-bound.

Additive-phase correction estimation (step 42) is as follows. Additive-phase corrections $\phi_{02}, \ldots, \phi_{0m}$ are estimate or updated. These phase corrections represent an unknown phase error that is constant throughout each image but varies from image to image. The assumption that $\phi_{00}=\phi_{01}=0$ is equivalent to ignoring an unknown average elevation. The phase corrections are estimated as follows. The average complex image value are calculated after correcting for the current elevation estimate:

$$S_\phi = \sum_{r,v} A_k(r,v) \exp\{jb_k\hat{u}(r,v)\} \quad (16)$$

then the resulting average residual phase is calculated:

$$\phi_{0k} = \arctan(I(S_\phi), R(S_{100})) \text{ for } k=0, \ldots, m. \quad (17)$$

For well-behaved terrain it is feasible to estimate each $\phi_{0k}$ only once without updating it for each additional image (i.e., each increment of m).

Maximum-likelihood estimation (step 43) is achieved as follows. The elevation $\bar{u}=\text{MLE}(u|A_0, \ldots, A_m; \phi_{02}, \ldots, \phi_{0m})$ is updated, where MLE denotes the maximum-likelihood estimate of u given the image and phase corrections. Additional details of the rationale for this maximum-likelihood estimation processing and its accuracy for multi-pass and multi-channel IFSAR elevation estimation are outlined below.

A lower-bound of elevation accuracy is estimated. The elevation accuracy measure expressed below is an estimate of the lower-bound on elevation standard deviation. It is derived from the Cramer-Rao lower bound (CRLB). The estimated accuracy is $$\sigma_u(r,v) = \frac{\sigma_{opt}(m)}{\sqrt{|A(r,v)|^2}} \quad (18)$$

where $\sigma_{opt}$, likened to an equivalent noise level for u, is given by $$\sigma_{opt}(m) = \quad (19)$$

$$\sum_{k=0}^{m-1} \sigma_k^{-2} \left[ \sum_{k=0}^{m-1} \sigma_k^{-2} b_k^2 \left( \sum_{j=0}^{m-1} \sigma_j^{-2} \right) - \left( \sum_{k=0}^{m-1} \sigma_k^{-2} b_k \right)^2 \right]^{-1}$$

The step size for elevation estimation is calculated. The step size, denoted SS, is selected to be as large as possible without sacrificing accuracy. For example, $$SS = \alpha \frac{\sigma_{opt}(m)}{|\alpha(r,v)|^2} \quad (20)$$

where $\alpha\sim 1$ is reasonable. For the particular elevation accuracy measure in equation (18), this becomes $SS=\alpha\sigma_u$.

The elevation is then estimated and is accomplished by calculating the elevation that maximizes the log-likelihood function. All previous calculations provide inputs or phase corrections to support this calculation. For u in the interval $(u(r,v)\pm U_0)$ in increments of SS, the following function is evaluated:

$$L(u) = \left| \sum_{k=0}^{m-1} \frac{A_k}{\sigma_k^2} \exp\{-j(b_k u + \phi_{0k})\} \right|. \quad (21)$$

This use of a weighted coherent sum of images to derive elevation from more than two SAR images comprises the heart of the present invention. The maximum sampled value $L(u_{max})$ and the corresponding argument $u_{max}$ are saved. This estimate of the peak location is refined through a standard quadratic interpolation using nearest-neighbors $L(u_{max}-SS)$ and $L(u_{max}+SS)$, denoting $$\hat{u}_{m1}(r,v) = QINTERP[L(u_{max})]. \quad (22)$$

Regardless of noise model, this is a weighted least-squares estimate of u, obtained through an exhaustive search. The search may instead be performed about the nominal elevation u. The search limit $U_0$ is derived either from the longest periodic component of the likelihood function or from the uncertainty in the initial elevation $\overline{U}$ or $\hat{u}(r,v)$.

The elevation and accuracy estimates are then saved. The outputs of the method 20 are $\hat{u}_{m1}(r,v)$ and $\sigma_u(r,v)$ computed using all images, i.e., with m=M.

Figure 3:
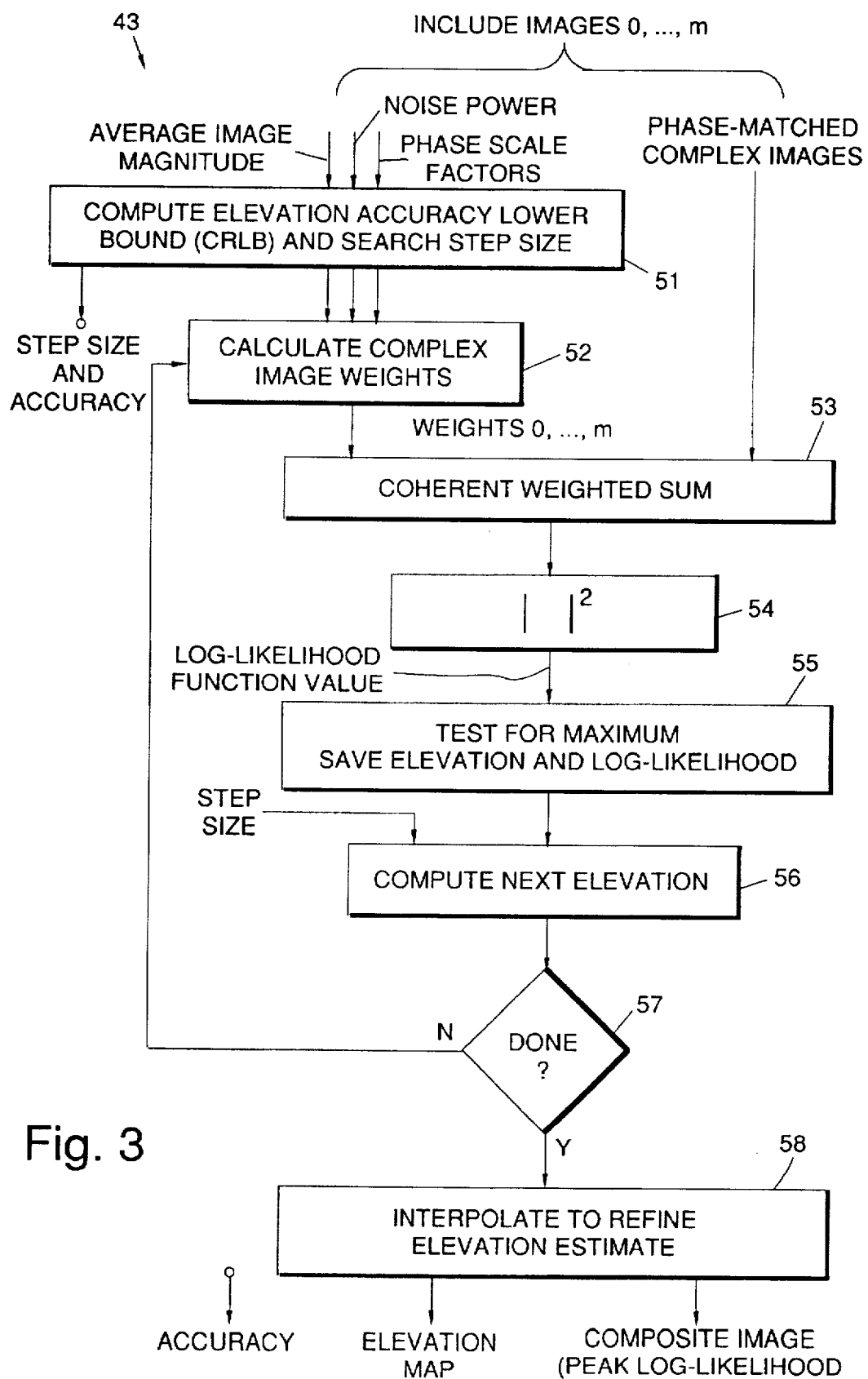
FIG. 3 is a flow diagram illustrating the processing steps for a maximum-likelihood estimation.

The details of the maximum-likelihood estimation step 43, which is central to the present invention, will be described in detail with reference to FIG. 3. FIG. 3 essentially describes equations (18) through (22). The maximum-likelihood estimation step 43 is an inner-most loop of a successive refinement procedure (step 40). The steps of the maximum-likelihood estimation 43 are as follows.

The first step is to compute 51 an elevation accuracy lower bound and search-step size. This is achieved by calculating a theoretical lower bound on elevation error variance derived from average image magnitude, noise power, and phase-difference scale factors. Accuracy is output for each pixel and is a useful product in its own right. The search step size is proportional to the accuracy lower-bound to achieve an accurate search for the best elevation estimate without excessive computation.

The next step is to calculate 52 complex image weights. There is a different weight for each image at each pixel. The magnitude of the weights are proportional to the inverse of the noise power for each image at the given pixel. The phase of the weights include the additive-phase corrections and a phase proportional to the elevation value to be tested (via the phase difference scale factor for each image).

The next step is to calculate 53 a coherent weighted sum. A weighted sum of each complex image value (at the given pixel) is calculated using the above-described weights.

The next step is to compute 54 the magnitude of the summation. This magnitude-squared value is proportional to the log-likelihood function under certain assumptions. The elevation value which maximizes this magnitude is the maximum-likelihood estimate of elevation at this pixel. The magnitude itself serves as a composite magnitude of the input images.

The next step is to test 55 for a maximum and save the elevation and magnitude values. The current elevation value and the corresponding image magnitude are saved. The current maximum, and the local maxima and their neighboring points are saved to aid in later interpolation/refinement of the elevation estimate.

The next step is to compute 56 the next elevation value by incrementing the elevation value by the previously computed step size.

Stopping criterion. The next step is to test 57 the incremented elevation value to determine whether it is within elevation search limits. Steps 52–57 are repeated (complex image weight calculation 52, weighted sum calculation 53, and so forth) if the stopping criterion is not met, illustrated by the feedback loop to step 52.

The last step is to interpolate 58 the elevation estimate to further refine the elevation estimate. Standard quadratic interpolation of the elevation estimate is employed about its optimum sampled value found above.

While the above processing steps describe the details of the method 20, several alternative elevation accuracy measures may provide better indications of accuracy. Some are dependent on the estimated elevation in each sample, requiring an additional pass through the data. They may be useful for detecting areas that will benefit from special processing. For example, areas with multiple scatterers at different elevations in the same sample (r,v) (like buildings) may be detected and a volume imaging algorithm applied locally to resolve the multiple scatterers. Other effects, such as low coherence due to object motion, spillover from strong targets that corrupt nearby terrain measurements, and the like, may be detected, flagged and/or resolved.

A first alternative criterion simply extends the general CRLB to revert to a short-baseline CRLB at low SAR. That is $$\sigma_u = \begin{cases} \sigma_{opt}(M-1)/|\overline{A(r,v)}|^2 & SNR > SNR_0 \\ \sigma_{opt}(1)/|\overline{A(r,v)}|^2 & SNR \leq SNR_0 \end{cases} \quad (23)$$

where $SNR_0$ is a transition SNR (nominally about 8 dB) whose value depends on the phase-difference scale factor ratios. A second alternative quality criterion includes a goodness-of-fit test comparing the actual minimum value of sum-of-squared the residuals (the exponent of equation (26) below evaluated at $u_{max}$) to its theoretical minimum based on the estimated setup parameters. A third alternative quality criterion is based on the second derivative of L at its peak, indicating accuracy assuming that any ambiguity is resolved. A fourth alternative quality criterion is based on the overall shape of L, including sidelobe structure. This considers the likelihood of an ambiguous measurement occurring due to the sidelobes of the likelihood function.

The rationale for the maximum likelihood estimate is as follows. As has been discussed previously, assume that the noise power $\sigma_k^2$, linear-phase and additive-phase corrections $\phi_k$, and the phase-difference scale factor ratios $b_k$, have been estimated. Assume that the images have been normalized for equal noise power, the linear phase corrections have been applied and that the images $(A_0, \ldots, A_{m-1})$ are ordered by increasing estimated phase-difference scale factors (wherein the smallest phase-difference scale factor is between $A_0$ and $A_1$, etc.).

For more compact notation, express the multiple passes and/or multiple channels as a vector:

$$\underline{A} = \begin{bmatrix} A_0 \\ A_1 \\ \cdot \\ \cdot \\ \cdot \\ A_{m-1} \end{bmatrix} \quad (24)$$

The maximum likelihood estimate is, by definition, $$\arg\max(u)\{\ln P_{\underline{A}|u}(\underline{A}|u)\} \quad (25)$$

where, under the stated additive Gaussian noise model, the likelihood function is given by $$P_{\underline{A|u}}(\underline{A}|u) = W \exp \left\{ -\frac{1}{2} \sum_{k=0}^{m-1} \frac{1}{\sigma_k^2} |A_k - a \exp\{-j(b_k u + \phi_{0k})\}|^2 \right\} \quad (26)$$

and W is some constant proportional to noise power in all images. Taking the log of equation (25) and dropping terms independent of u yields an equivalent objective function (loosely referred to as the "log-likelihood")

$$L(u) = \sum_{k=0}^{m-1} \frac{A_k}{\sigma_k^2} |\exp\{-j(b_k u + \phi_{0k})\}| \quad (27)$$

The argument that maximizes equation (27) is identical to that which maximizes equation (26). Regardless of the noise model, that $\arg\max_u(L(u))$ is a weighted-least-squares estimate of u.

The rationale for the Cramer-Rao lower bound on $\bar{u}_{m1}(\underline{A})$ is as follows. A measure of the quality of the estimate obtained from equation (25) is given by the Cramer-Rao lower bound (CRLB). It provides a lower-bound for the variance of u assuming that the signal and noise models are valid. Expressing the unknown parameters as a vector $$r = \begin{bmatrix} u \\ x \\ y \end{bmatrix} \quad (28)$$

where x and y are the real and imaginary parts of a, the CRLB may be expressed as $$W\{[\underline{r}_{m1} - r_0][\underline{r}_{m1} - r_0]\} \geq J^{-1} \quad (29)$$

where $$J = -E_{\underline{A}|\underline{r}}[\nabla_r \nabla_r \ln P_{\underline{A}|\underline{r}} \underline{A}|r]_{r=0}. \quad (30)$$

From the matrix $J^{-1}$, the CRLB of the estimate of u is found to be $$J_{uu}^{-1} = \quad (31)$$

$$\frac{1}{|a|^2} \sum_{k=0}^{m-1} \sigma_k^{-2} \left[ \sum_{k=0}^{m-1} \sigma_k^{-2} b_k^2 \left( \sum_{j=0}^{m-1} \sigma_j^{-2} \right) - \left( \sum_{k=0}^{m-1} \sigma_k^{-2} b_k \right)^2 \right]^{-1}$$

The ML estimate of a is found to be $$\hat{a}_{ml}(\underline{A}) = \left( \sum_{i=0}^{m-1} \frac{1}{\sigma_i^2} \right)^{-1} \sum_{k=0}^{m-1} \frac{A_k e^{jb_k u}}{\sigma_k^2} \quad (32)$$

The upper-bound $\hat{a}_{m1}$ may be expressed as $$\hat{a}_{ml}(\underline{A}) \leq \left( \sum_{i=0}^{m-1} \frac{1}{\sigma_i^2} \right)^{-1} \sum_{k=0}^{m-1} \frac{|A_k|^2}{\sigma_k^2} \quad (33)$$

or for all identical $\sigma_k$, $$\hat{a}_{ml}(\underline{A}) \leq \frac{1}{m} \sum_{i=0}^{m-1} |A_k|^2 \quad (34)$$

providing the rationale for our estimate of $|a|^2$. This biased estimate tends to preserve the lower bound property of the CRLB and the bias is small enough for reasonable SNR that the resulting estimate of the CRLB is adequate. At low SNR, however, the CRLB can grossly underestimate the elevation variance even with known $|a|^2$. The overestimate of $|a|^2$ increases this bias further. At low signal-to-noise rations, the CRLB evaluated using the two images with the smallest phase-difference scale factor $b_0$ may be used. This produces a more realistic quality estimate at low SNR. The transition SNR depends on the phase-difference scale factor ratios and noise variance ratios for the particular images.

The rationale for the above-described search procedure is as follows. The elevation estimate is found by searching equation (27) over u for the maximum. The step size in searching for u should be proportional to the CRLB, since accuracy is not improved by a step size much finer than the fundamental uncertainty. The interval over which to search is determined by the initial uncertainty, which is a function of the phase-difference scale factor. It is assumed in the search that the initial uncertainty is within one coarse ambiguity (the longest periodic component of the log-likelihood function).

Thus there has been described a new and improved signal processing method for use with multi-pass and multi-channel interferometric synthetic aperture radars. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A signal processing method for use with multi-pass and multi-channel interferometric synthetic aperture radar systems, said method comprising the steps of:

performing a process on raw synthetic aperture radar data to produce a plurality of synthetic aperture radar images therefrom;

performing a process on the synthetic aperture radar images to produce a plurality of linear phase matched synthetic aperture radar images and predetermined processing parameters; and performing a process on the plurality of linear phase matched synthetic aperture radar images to produce a synthetic aperture radar elevation map.

2. The method of claim 1 wherein the step of performing a process on the raw synthetic aperture radar data to produce a plurality of synthetic aperture radar images comprises the steps of:

compensating for relative motion between each of the plurality of images;

converting the plurality of images into ground plane polar format;

compressing range data associated with each of the images; and registering each of the images to each other.

3. The method of claim 1 wherein the step of performing a process on the synthetic aperture radar images to produce a plurality of linear phase matched synthetic aperture radar images comprises the steps of:

matching noise power contained in each of the images to normalize the images to compensate for differences in gain of the systems from scan to scan;

matching linear phase values of each of the images to correct for phase differences by estimating phase matching parameters for each of the images;

estimating a phase-difference scale factor for each of the images; and ordering each of the images in terms of increasing phase difference scale factors.

4. The method of claim 3 wherein the step of matching linear phase values of each of the images comprises the steps of:

computing a pairwise interferogram for adjacent images;

summing sample-pair products of the interferogram to estimate the linear phase thereof; and computing the phase of the summed sample-pair products.

5. The method of claim 3 which further comprises the step of:

applying a soft limiter to a magnitude component of the interferograms before the above summations are performed, preventing a few very large magnitude samples from dominating the estimate.

6. The method of claim 4 wherein the step of summing sample-pair products comprises the step of:

computing a magnitude-weighted median phase.

7. The method of claim 3 wherein the step of ordering each of the images comprises the steps of:

finding an image-pair having the smallest phase-difference scale factor;

adding an image that results in the smallest increase in total elevation aperture is added to this list of image pairs; and repeating the above two steps until no more images remain.

8. The method of claim 1 wherein the step of performing a process on the plurality of linear phase matched synthetic aperture radar images to produce a synthetic aperture radar elevation map further comprises the step of:

performing a process on the plurality of linear phase matched synthetic aperture radar images to produce an elevation quality map.

9. The method of claim 1 wherein the step of performing a process on the plurality of linear phase matched complex synthetic aperture radar images to produce a synthetic aperture radar elevation map comprises the steps of:

computing an initial elevation map based on one image-pair and computing average signal power;

estimating additive phase correction values for each of the linear phase matched images; and estimating elevation values for each of the linear phase matched images to produce the elevation map.

10. The method of claim 9 wherein the step of computing comprises the steps of:

estimating additive-phase corrections and elevation values;

calculating an initial elevation map using an image-pair having the shortest phase-difference scale factor; and computing a sample-by-sample average of the magnitude of the gain-matched images to compute the step size for elevation estimation and to compute elevation accuracy or quality.

11. The method of claim 9 wherein the step of estimating additive phase correction values comprises the steps of:

estimating additive-phase corrections that represent an unknown phase error that is constant throughout each image but varies from image to image by calculating the average image value after correcting for the current elevation estimate; and calculating the resulting average residual phase.

12. The method of claim 11 wherein the step of estimating elevation values comprises the step of:

computing a maximum-likelihood estimate of elevation given the image and phase corrections.

13. The method of claim 12 wherein the step of computing a maximum-likelihood estimate of elevation values comprises the steps of:

estimating a lower-bound of elevation accuracy derived from a Cramer-Rao lower bound;

calculating a step size for elevation estimation;

estimating the elevation value by calculating an elevation that maximizes a log-likelihood function;

saving the maximum sampled value and corresponding argument to provide a maximum likelihood estimate of elevation; and saving the elevation and accuracy estimates.

14. The method of claim 12 wherein the step of computing a maximum-likelihood estimate of elevation values comprises the steps of:

computing 51 an elevation accuracy lower bound and search-step size;

calculating 52 complex image weights;

calculating 53 a coherent weighted sum;

computing 54 the magnitude of the calculated summation;

testing 55 for a maximum and saving the elevation and magnitude values;

computing 56 the next elevation value by incrementing the elevation value using the previously computed step size;

testing 57 the incremented elevation value to determine whether it is within elevation search limits, and repeating all but the first step above if the stopping criterion is not met; and interpolating 58 the elevation estimate to further refine it.

15. The method of claim 14 wherein the computing step 51 comprises the step of calculating a theoretical lower bound on elevation error variance derived from average image magnitude, noise power, and phase-difference scale factors.

* * * * *